May 13, 1941.　　　C. C. LEADER　　　2,242,005
DYNAMOELECTRIC MACHINE
Filed Oct. 25, 1939
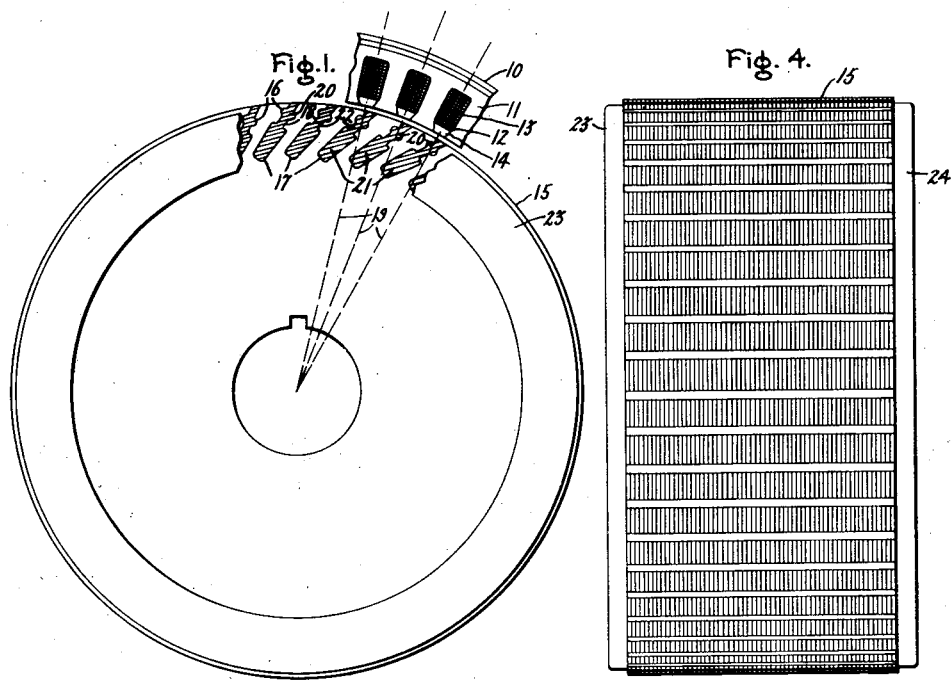
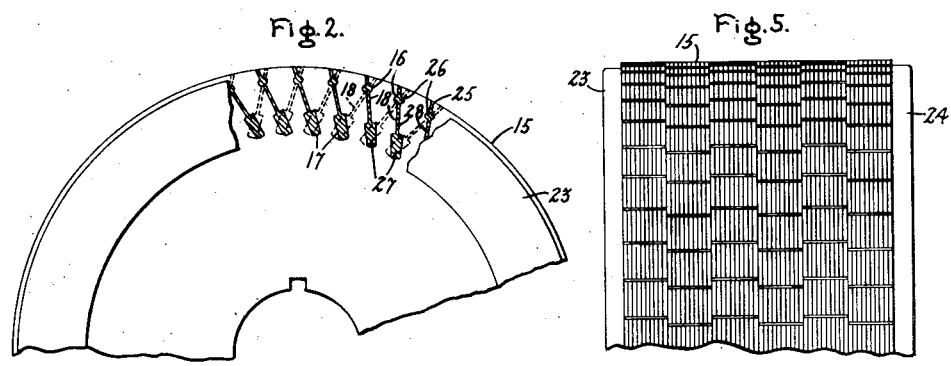
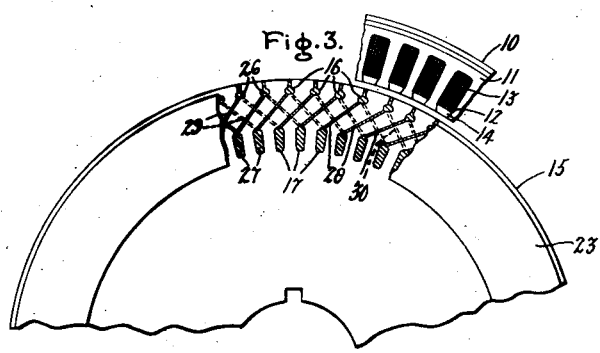
Inventor:
Charles C. Leader,
by Harry E. Dunham
His Attorney.

Patented May 13, 1941

2,242,005

UNITED STATES PATENT OFFICE 2,242,005

DYNAMOELECTRIC MACHINE

Charles C. Leader, Schenectady, N. Y., assignor to General Electric Company, a corporation of New York Application October 25, 1939, Serial No. 301,198

9 Claims. (Cl. 172—120)

My invention relates to improvements in dynamoelectric machines, and particularly to the type of machine utilizing a multiple section winding in one of the elements thereof.

An object of my invention is to provide a dynamoelectric machine having an improved multiple section winding.

Another object of my invention is to provide an improved dynamoelectric machine having a multiple section winding slot, with the different sections of such slots radially out of line with other sections of the same slot.

Further objects and advantages of my invention will become apparent, and my invention will be better understood from the following description referring to the accompanying drawing, and the features of novelty which characterize my invention will be pointed out with particularity in the claims annexed to and forming part of this specification.

In the drawing, Fig. 1 is an end view of a part of a dynamoelectric machine embodying my invention, partly broken away to illustrate the relative arrangement of the windings; Fig. 2 is an end view of a part of the rotatable member of a dynamoelectric machine partly broken away to illustrate a modification of the arrangement shown in Fig. 1; Fig. 3 is an end view of a part of a dynamoelectric machine partly broken away to show another modification of the arrangement shown in Fig. 1; Fig. 4 is a side elevational view of the rotatable member shown in Fig. 1; and Fig. 5 is a side elevational view of a part of the dynamoelectric machine rotatable member shown in Fig. 2.

Referring to the drawing, I have shown in Fig. 1 a dynamoelectric machine having a stationary member frame 10 arranged about a stationary member core of magnetic material 11 with winding slots 12 in which is arranged an exciting winding 13. Wedges 14 are arranged in the outer portion of the slots 12 to retain the winding 13 in position therein.

The machine also is provided wiith a rotatable member having a core of magnetic material 15 formed of laminations 15 which are provided with a plurality of winding slots arranged about the outer periphery thereof. These winding slots are of the multiple section type and include an outer section 16 of relatively small area and an inner section 17 of relatively larger area than the outer section 16. A small interconnecting section or neck 18 connects together the outer section 16 and the inner section 17. The laminations 15 are assembled to form a core with the inner and outer sections of the winding slots in registry so as to provide continuous inner and outer slot sections longitudinally through the core. The dynamoelectric machine illustrated in this figure is of the squirrel cage induction motor type, and in order to obtain a large starting torque, such machines generally have been provided with a high resistance outer winding and a relatively lower resistance inner winding which is used to provide the desired maximum torque under running conditions. To obtain these characteristics in a cast squirrel cage winding, high resistance for starting purposes generally has been obtained by forming the outer slot section of relatively small area and the connected inner slot section of a relatively larger area. Certain slot arrangements, however, when used in a machine with radial slots has resulted in a tendency for the rotatable member to "lock" at standstill. In order to reduce this tendency, I have arranged the multiple section slots so that the relatively high resistance outer section 16 of the slots is radially in line with a stator slot 12, as indicated by the dash radius lines 19, and the inner relatively larger section 17 of the slots of the rotatable member is arranged radially displaced out of alignment with the outer section 16. This radial alignment displacement of the larger inner section 17 is made to extend radially partly under the outer section 16 of the next adjacent slot which is disconnected therefrom and also partly radially under the next adjacent stator slot 12. A cast multiple section winding having an outer small relatively high resistance section 20 and inner relatively low resistance larger section 21 and a small interconnecting section 22 is arranged in the slots of the rotatable member so as to provide a multiple resistance winding. This also provides a multiple inductance winding, as the outer conductor section 20 has a relatively low inductance and the inner conductor section 21 has a relatively higher inductance as in conventional windings of this type. This is obtained by providing a section intermediate the inner and outer conductor sections having a magnetic reluctance less than the outer and inner slot sections as shown in Figs. 1, 2 and 3. The winding illustrated in this figure is a cast squirrel cage winding, and may be formed of any desirable electrically conductive material, such as aluminum or copper, with the ends of the multiple section conductors in each of the slots connected together to form a complete winding by short-circuiting end rings 23 and 24 cast integral with the ends of the conductors in contact with the outer lamination at each end of the core. A winding formed of bars riveted, brazed, or otherwise secured to the end rings also can be arranged as shown in this figure, and the outer section may be formed of a higher resistance material than the inner section, further to increase the multiple resistance effect as obtained by the different areas of the different sections. It has been found that by having each of the multiple section conductors partly under two different stator teeth at the same time, the magnetic noise also is reduced in this type machine.

In Fig. 2, I have shown a modification of the arrangement illustrated in Fig. 1, wherein a dynamoelectric machine rotatable member is provided with a core of magnetic material formed of laminations 15 having multiple section slots with outer relatively small sections 16 and inner relatively large sections 17 which are offset from radial alignment with the outer sections. A small interconnecting section or neck 18 connects together the inner and outer sections of the slots. The laminations 15 are arranged in groups, with the inner and outer sections of the multiple section slots in alignment longitudinally through the core, and each group of laminations is reversed with respect to the next adjacent group of laminations, so that the radial displacement out of alignment of the inner and outer section of the slots extends in opposite directions in adjacent groups of laminations. These different groups of laminations are arranged so that the outer smaller sections 16 of the slots provide a continuous slot section through the core longitudinally thereof, and the inner larger sections 17 of the slots also are arranged to provide a continuous relatively larger slot section longitudinally through the core. With this arrangement, the interconnecting section or neck 18 of each slot provides a continuous section longitudinally through the core only through each group of laminations, and this interconnecting section provides a discontinuous connecting slot section longitudinally through the entire element or core. The outer ends 25 of the slots also are discontinuous longitudinally through the core, as can be seen in Fig. 5. The dotted sections shown in Fig. 2 illustrate the relative position of the alternate group of laminations from those shown in solid section. A winding is arranged in the slots of the laminations 15 and is made to conform to the respective slot sections thereof having an outer relatively high resistance small section 26 and an inner relatively low resistance larger section 27. These conductor sections extend continuously longitudinally through the core and are connected together by connecting sections 28. Since these connecting sections 28 extend in opposite directions in different groups of laminations, the inner relatively low resistance large sections 27 are connected to each next adjacent outer high resistance slot section. This discontinuity of the connecting sections 28 longitudinally through the core prevents the flow of electric current longitudinally through this connecting section and provides a higher starting resistance, which results in a rotor which has the starting characteristics of a true double squirrel cage winding; that is, a winding in which there is no conductor in the neck connecting the top and bottom conductors. This type of structure gives the highest starting torque for a given electric current for a given maximum torque and full load slip. With this new type slot, the maximum torque and full load slip obtainable correspond to a winding in a slot, the entire section of which contains active conductor. In other words, this rotor winding provides true double squirrel cage starting characteristics, and in addition, provides a higher maximum torque and a lower full load slip than is possible with a true double squirrel cage slot assembled in the conventional manner. The reason for this appears to be that under starting conditions with line frequency in the rotor, substantially no current flows through the neck connecting the inner and outer conductor sections, because this path is not continuous longitudinally through the machine, and the current cannot bypass these blanked off sections into the inner bar due to the phase displacement of the currents in this offset bar and the resultant high impedance of this circuit. This, therefore, is the equivalent of separate inner and outer bars with the current flow therethrough as in a true double squirrel cage winding. For running conditions in the range from maximum torque to full load torque and below, the frequency of the rotor currents are relatively low and the current is distributed through the entire bar section more or less uniformly, resulting in improved running characteristics.

In Fig. 3, I have shown a modification of the dynamoelectric machine shown in Figs. 1 and 2, which includes a stationary member having a frame 10 supporting a core of laminations 11 in which is formed a plurality of winding slots 12. Excitation is provided to the machine by an exciting winding 13 arranged in the slots 12 and retained in position by wedges 14. A rotatable member is arranged to react electrodynamically with the stationary member of the machine and is provided with a plurality of multiple section winding slots adjacent the periphery thereof. These slots are formed with a relatively small outer conductor slot section 16, a small slot opening extending from this outer conductor section to the outer edge of the laminations, and an inner relatively large conductor section slot 17, each extending substantially radially of the rotor. The inner and outer conductor slot sections are connected together by a relatively small and narrow interconnecting section or neck 29 which extends angularly therebetween. A winding is arranged in these slots with conductors which conform substantially to the different slot sections. In this arrangement, the inner and outer conductor sections of each slot are displaced radially out of alignment from one another more than one slot width of the rotatable member and of the stationary member, and the laminations are arranged in groups as in Figs. 2 and 5, with the inner and outer sections of the conductor slots in all of the groups of laminations in longitudinal alignment to provide continuous conductor slot sections longitudinally of the rotor. Adjacent groups of laminations are reversed with respect to each other, so that the displacement out of radial alignment of the inner and outer slot sections is in the opposite direction in adjacent groups. This results in a substantially interrupted and discontinuous connecting section 29 longitudinally through the core. Since the radial displacement between the inner and outer sections of the conductor is more than one slot width, small conductor sections 30 are formed between the relatively small outer conductor sections 26 and the larger inner conductor sections 27. These small conductor sections 30 are formed by an overlapping of the connecting slot sections or necks 29 of the different groups of laminations and form continuous conductor sections longitudinally through the core element of relatively smaller section than the small conductor sections 26. It has been found that this arrangement provides further improvement in the starting and running characteristics of such a winding over an arrangement such as is illustrated in Figs. 2 and 5. This longitudinally interrupted connecting slot section arrangement is further explained and claimed in my copending application Serial No. 301,201 filed October 25, 1939, and assigned to the same assignee as this application.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine having a stationary member and a rotatable member, said stationary member including an element of magnetic material formed with winding slots therein, a winding in said winding slots, said rotatable member including an element of magnetic material having winding slots formed therein as multiple section conductor slots with inner and outer conductor sections with a section intermediate said inner and outer conductor sections having a magnetic reluctance lower than the magnetic reluctance of said inner and outer slot sections, each of said slots being arranged to extend obliquely inwardly to span an arc of a plurality of said stationary member core slots, a winding having conductors in said slots arranged to conform to the respective sections thereof, and means for connecting together said conductors to complete said winding.

2. A dynamoelectric machine having a stationary member and a rotatable member, said stationary member including an element of magnetic material formed with winding slots therein, a winding in said winding slots, said rotatable member including an element of magnetic material having winding slots formed therein as multiple section conductor slots, a relatively high resistance conductor section in each of said outer conductor slot sections and a relatively low resistance conductor section in each of said inner conductor slot sections with a relatively narrower slot section connecting together said inner and outer slot sections, said high resistance conductor section and said low resistance conductor section of each slot being arranged to extend under different slots of said stationary member element, and means for connecting together said conductors to complete said winding.

3. A dynamoelectric machine having a stationary member and a rotatable member, said stationary member including an element of magnetic material formed with winding slots therein, a winding in said winding slots, said rotatable member including an element of magnetic material comprising laminations having winding slots formed therein, each of said winding slots being formed as a multiple resistance conductor slot having a relatively small outer conductor section and a relatively large inner conductor section with a relatively narrow slot section connecting together said inner and outer sections, each of said inner conductor sections of each slot being displaced radially out of alignment with its respectively connected outer conductor section and each of said multiple conductor slots being arranged to extend obliquely inwardly under a plurality of said stationary member core slots, a winding having conductors in said slots arranged to conform to the respective sections thereof, and means for connecting together said conductors to complete said winding.

4. A dynamoelectric machine including an element of magnetic material having winding slots formed therein and an exciting winding arranged in said slots, a second element of magnetic material adapted to react electrodynamically with said first-mentioned element and having winding slots therein, each of said winding slots in said second element being formed as a multiple section conductor slot of a relatively small outer conductor section and a relatively large inner conductor section with a relatively narrower slot section connecting together said inner and outer slot sections, each of said inner conductor sections of each slot being arranged radially out of alignment with its respective outer conductor section and extending radially partly under the outer section of another of said slots and arranged to extend under a different exciting winding slot than said outer slot section, a winding having conductors in said slots arranged to conform to the respective sections thereof, and means for connecting together said conductors to complete said winding.

5. A member for a dynamoelectric machine including an element of magnetic material comprising laminations having winding slots formed therein each of said winding slots being formed as a multiple section conductor slot including a relatively small conductor section and a relatively large conductor section, said small conductor section and said large conductor section of each slot being arranged radially displaced out of alignment, said laminations being arranged with the radial displacement of said large conductor sections with respect to said small conductor sections of said winding slots displaced in opposite directions in different laminations and providing continuous large conductor sections longitudinally through said element, a winding having conductors in said slots arranged to conform substantially to the respective sections thereof, and means for connecting together said conductors to complete said winding.

6. A member for a dynamoelectric machine including an element of magnetic material comprising laminations having winding slots formed therein, each of said winding slots being formed as a multiple section conductor slot having a relatively small outer conductor section and a relatively large inner conductor section with a relatively narrow slot section connecting together said inner and outer sections, each of said inner conductor sections of each slot being displaced angularly toward an outer conductor section disconnected therefrom in said lamination and radially out of alignment with its respective connected outer conductor section, a winding having conductors in said slots arranged to conform to the respective sections thereof, and means for connecting together said conductors to complete said winding.

7. A member for a dynamoelectric machine including an element of magnetic material comprising laminations having winding slots formed therein, each of said winding slots being formed as a multiple section conductor slot including a relatively small conductor section and a relatively large conductor section, said small conductor section and said large conductor section of each slot being arranged radially displaced out of alignment, said laminations being arranged with the radial displacement of said large conductor sections with respect to said small conductor sections of said winding slots displaced in opposite directions in different laminations and providing continuous small conductor sections and continuous large conductor sections through said element, a winding having conductors in said slots arranged to conform substantially to the respective sections thereof, and means for connecting together said conductors to complete said winding.

8. A member for a dynamoelectric machine including an element of magnetic material comprising laminations having winding slots formed therein, each of said winding slots being formed as a multiple section conductor slot including an inner conductor section and an outer conductor section, said inner conductor section and said outer conductor section of each slot being arranged radially displaced out of alignment, certain of said laminations in said element being arranged with the radial displacement of said inner conductor sections with respect to said outer conductor sections of said winding slots displaced in the opposite direction from the remainder of said laminations and providing continuous inner conductor sections longitudinally through said element, a winding having a relatively high resistance conductor in each of said outer slot sections and a relatively low resistance conductor in each of said inner slot sections, and means for connecting together said conductors to complete said winding.

9. A member for a dynamoelectric machine including an element of magnetic material comprising laminations having winding slots formed therein, each of said winding slots being formed as a multiple section conductor slot including an inner conductor section and an outer conductor section, said inner conductor section and said outer conductor section of each slot being arranged radially displaced out of alignment, said laminations being arranged with the radial displacement of said inner conductor sections with respect to said outer conductor sections of said winding slots displaced in opposite directions in different laminations and providing continuous inner conductor sections longitudinally through said element, a winding having a relatively high resistance conductor in said outer slot section and a relatively low resistance conductor in said inner slot section, means for connecting each of said low resistance conductors to a plurality of said high resistance conductors, and means for connecting together said conductors to complete said winding.

CHARLES C. LEADER.